US008054036B2

(12) United States Patent
Onishi et al.

(10) Patent No.: US 8,054,036 B2
(45) Date of Patent: Nov. 8, 2011

(54) POWER TRANSMISSION CONTROL DEVICE, POWER RECEPTION CONTROL DEVICE, NON-CONTACT POWER TRANSMISSION SYSTEM, POWER TRANSMISSION DEVICE, POWER RECEPTION DEVICE, AND ELECTRONIC INSTRUMENT

(75) Inventors: Kota Onishi, Nagoya (JP); Kentaro Yoda, Chino (JP); Takahiro Kamijo, Fujimi-cho (JP); Haruhiko Sogabe, Chino (JP); Kuniharu Suzuki, Tokyo (JP); Hiroshi Kato, Yokohama (JP); Katsuya Suzuki, Takasaki (JP); Manabu Yamazaki, Hiratsuka (JP)

(73) Assignees: Seiko Epson Corporation, Tokyo (JP); Sony Ericsson Mobile Communications Japan, Inc., Tokyo (JP)

( * ) Notice: Subject to any disclaimer, the term of this patent is extended or adjusted under 35 U.S.C. 154(b) by 881 days.

(21) Appl. No.: 12/071,142

(22) Filed: Feb. 15, 2008

(65) Prior Publication Data

US 2008/0197804 A1   Aug. 21, 2008

(30) Foreign Application Priority Data

Feb. 16, 2007  (JP) ................................ 2007-036745

(51) Int. Cl.
*H02J 7/00* (2006.01)
*H04M 1/64* (2006.01)
*H04B 15/00* (2006.01)
*H02H 3/00* (2006.01)

(52) U.S. Cl. ........ 320/108; 320/109; 320/114; 320/115; 320/139; 455/69; 455/411; 455/437; 379/68; 379/69; 379/443; 361/82; 307/104

(58) Field of Classification Search .................... 320/108
See application file for complete search history.

(56) References Cited

U.S. PATENT DOCUMENTS 5,991,170 A * 11/1999 Nagai et al. ..................... 363/20
6,016,046 A * 1/2000 Kaite et al. ..................... 320/108
(Continued)

FOREIGN PATENT DOCUMENTS

JP           A 6-339232           12/1994
(Continued)

OTHER PUBLICATIONS

U.S. Appl. No. 12/007,671, filed Jan. 14, 2008 in the name of Kota Onishi et al.

(Continued)

*Primary Examiner* — Edward Tso
*Assistant Examiner* — Yalkew Fantu
(74) *Attorney, Agent, or Firm* — Oliff & Berridge, PLC

(57) ABSTRACT

A power transmission device performs power-saving power transmission that transmits a small amount of power as compared with normal power transmission when the power transmission device has detected that a battery of a load has been fully charged so that the operation of a charge control device (charge control IC) of the load is maintained, thereby enabling recharging due to a charge management function of the charge control device. Since the load state of a power reception device increases when recharging has started, the power transmission device detects an increase in the load state and changes power transmission from power-saving power transmission to normal power transmission. When the power reception device has been removed during power-saving power transmission, the power transmission device detects that the power reception device has been removed, and stops continuous power transmission so that unnecessary power consumption does not occur.

17 Claims, 10 Drawing Sheets

U.S. PATENT DOCUMENTS

| | | | |
|---|---|---|---|
| 6,124,700 A * | 9/2000 | Nagai et al. | 320/132 |
| 7,109,682 B2 * | 9/2006 | Takagi et al. | 320/108 |
| 7,133,703 B2 * | 11/2006 | Aoshima et al. | 455/574 |
| 2002/0089305 A1 * | 7/2002 | Park et al. | 320/108 |

FOREIGN PATENT DOCUMENTS

| | | |
|---|---|---|
| JP | A-9-233706 | 9/1997 |
| JP | A 11-146569 | 5/1999 |
| JP | A-2000-166129 | 6/2000 |
| JP | A 2005-6459 | 1/2005 |
| JP | A 2006-60909 | 3/2006 |
| JP | A-2006-115562 | 4/2006 |
| JP | A-2006-141170 | 6/2006 |

OTHER PUBLICATIONS

U.S. Appl. No. 12/007,672, filed Jan. 14, 2008 in the name of Kota Onishi et al.

New U.S. Patent Application filed Feb. 15, 2008 in the name of Kota Onishi et al.

* cited by examiner

X: CHARACTERISTICS DURING NORMAL POWER RECEPTION
Y: CHARACTERISTICS DURING POWER-SAVING POWER RECEPTION
P: SECONDARY-SIDE LOAD CURRENT IN STANDBY STATE
Z: REDUCTION IN CURRENT CONSUMPTION IN STANDBY STATE

POWER TRANSMISSION CONTROL DEVICE, POWER RECEPTION CONTROL DEVICE, NON-CONTACT POWER TRANSMISSION SYSTEM, POWER TRANSMISSION DEVICE, POWER RECEPTION DEVICE, AND ELECTRONIC INSTRUMENT

Japanese Patent Application No. 2007-36745 filed on Feb. 16, 2007, is hereby incorporated by reference in its entirety.

BACKGROUND OF THE INVENTION

The present invention relates to a power transmission control device, a power reception control device, a non-contact power transmission system, a power transmission device, a power reception device, an electronic instrument, and the like.

In recent years, non-contact power transmission (contactless power transmission) which utilizes electromagnetic induction to enable power transmission without metal-to-metal contact has attracted attention. As application examples of non-contact power transmission, charging a portable telephone, a household appliance (e.g., telephone handset), and the like has been proposed.

JP-A-2006-60909 discloses a non-contact power transmission device using a primary coil and a secondary coil, for example.

In a charging device utilizing non-contact power transmission disclosed in JP-A-6-339232 and a non-contact power transmission system disclosed in JP-A-11-146569, a power-receiving-side device detects that a secondary battery has been fully charged and notifies a power transmission device that charging has completed, and the power transmission device then stops power transmission.

A non-contact power transmission system disclosed in JP-A-2005-6459 detects an abnormality in load (i.e., an open state or a low-load state has occurred) when supplying power, and causes a power transmission device to decrease the oscillation frequency of an oscillation circuit so that heat generation or breakage of components is prevented.

When a secondary battery is connected to a charger after completion of charging, the battery voltage gradually decreases due to a discharge from the secondary battery. Therefore, it is desirable to recharge the battery, if necessary.

According to the technologies disclosed in JP-A-6-339232 and JP-A-11-146569, since power supply from the power transmission device is completely stopped after the battery of the power reception device has been fully charged, it is impossible to recharge the secondary battery after completion of charging.

The technology disclosed in JP-A-2005-6459 aims at preventing heat generation or breakage of components due to an abnormality in load when supplying power, and does not take recharging into consideration.

SUMMARY

According to one aspect of the invention, there is provided a power transmission control device provided in a power transmission device of a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a power-transmission-side control circuit that controls the power transmission device, when the power transmission device has detected that a battery included in the load has been fully charged, the power-transmission-side control circuit stopping normal power transmission to the power reception device and performing power-saving power transmission that transmits a small amount of power as compared with the normal power transmission.

According to another aspect of the invention, there is provided a power reception control device provided in a power reception device of a non-contact power transmission system, the non-contact power transmission system transmitting power from a power transmission device to the power reception device by electromagnetically coupling a primary coil and a secondary coil to transmit the power to a load of the power reception device, the power reception control device comprising:

a power-reception-side control circuit that controls the power reception device, when a battery included in the load has been fully charged, the power-reception-side control circuit performing control that the power reception device transmits information that indicates that the battery has been fully charged to the power transmission device.

According to another aspect of the invention, there is provided a non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power transmission device including a power-transmission-side control circuit that controls the power transmission device;

the power reception device including:

a power-reception-side control circuit that controls the power reception device;

a full-charge detection circuit that detects whether or not a battery has been fully charged; and a frequency detection circuit that detects a power transmission frequency of the power transmission device;

the load of the power reception device including:

the battery; and a charge control device that manages charging the battery, detects that the battery requires recharging after the battery has been fully charged, and recharges the battery;

the power-reception-side control circuit performing control that the power reception device transmits a save command that requests power-saving power transmission to the power transmission device when the full-charge detection circuit has detected that the battery included in the load has been fully charged and the frequency detection circuit has detected that a power transmission frequency of the power transmission device is a frequency other than a power-saving power transmission frequency;

the power-transmission-side control circuit changing power transmission from normal power transmission to the power-saving power transmission when receiving the save command from the power reception device during the normal power transmission;

the power-transmission-side control circuit monitoring a load state of the power reception device during the power-saving power transmission, and, when the power-transmission-side control circuit has detected that the load state of the power reception device has changed from a low-load state to a high-load state when recharging of the battery included in the load has started, the power-transmission-side control circuit changing power transmission from the power-saving power transmission to the normal power transmission; and the power-transmission-side control circuit changing power transmission from the power-saving power transmission to the normal power transmission in a given cycle during the power-saving power transmission, monitoring a response from the power reception device relating to the change from the power-saving power transmission to the normal power transmission, again changing power transmission from the normal power transmission to the power-saving power transmission when a save command that requests the power-saving power transmission has been received from the power reception device, and determining that the power reception device has been removed when the power-transmission-side control circuit cannot receive the save command from the power reception device and stopping continuous power transmission.

According to another aspect of the invention, there is provided a power transmission device comprising:

the above power transmission control device; and a power transmission section that generates an alternating voltage and supplies the alternating voltage to the primary coil.

According to another aspect of the invention, there is provided a power reception device comprising:

the above power reception control device; and a power receiving section that converts an induced voltage in a secondary coil into a direct voltage.

According to another aspect of the invention, there is provided an electronic instrument comprising the above power transmission device.

According to another aspect of the invention, there is provided an electronic instrument comprising:

the above power reception device; and a load, power being supplied to the load from the power reception device.

BRIEF DESCRIPTION OF THE SEVERAL VIEWS OF THE DRAWING

FIG. 1A is an oblique view showing a state in which a portable telephone as a power reception device is placed on a charger (cradle) as a power transmission device, and FIG. 1B is a cross-sectional view showing the main portion of electronic instruments which is illustrative of the principle of power transmission from a power transmission device to a power reception device.

DETAILED DESCRIPTION OF THE EMBODIMENT

Figure 1A:
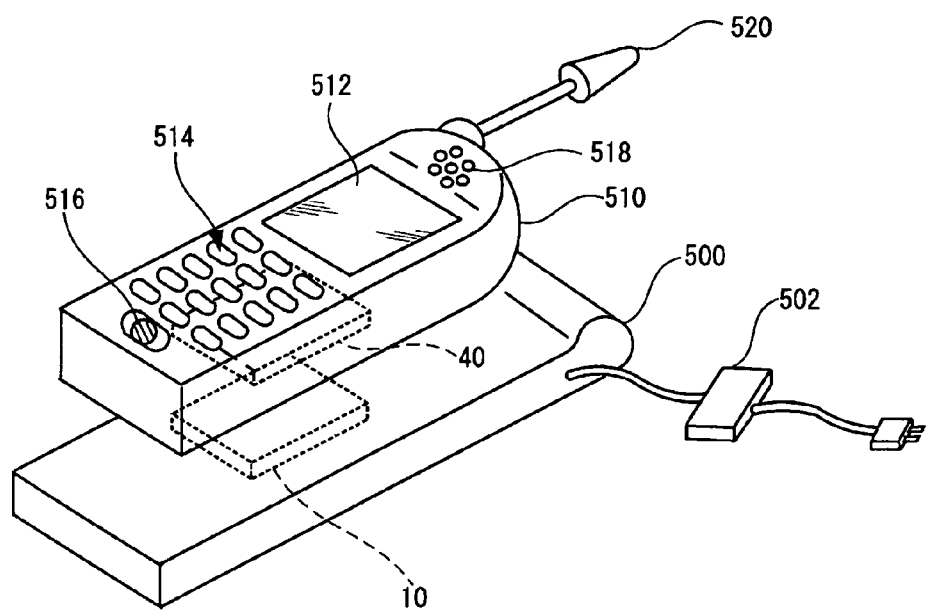
FIGS. 1A and 1B are views showing examples of an electronic instrument utilizing non-contact power transmission.

The invention has been achieved in view of the above-described consideration. Some aspects of the invention may enable a battery of a load to be recharged after the battery has been fully charged utilizing non-contact power transmission, and may easily implement such recharging.

(1) According to one embodiment of the invention, there is provided a power transmission control device provided in a power transmission device of a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a power-transmission-side control circuit that controls the power transmission device, when the power transmission device has detected that a battery included in the load has been fully charged, the power-transmission-side control circuit stopping normal power transmission to the power reception device and performing power-saving power transmission that transmits a small amount of power as compared with the normal power transmission.

Power transmission (i.e., power-saving power transmission) that transmits a small amount of power as compared with normal power transmission is continuously performed after the battery has been fully charged so that power (power supply voltage) is supplied to the load. This ensures that the load maintains its charge management function even after the battery has been fully charged. Accordingly, when it is necessary to recharge the battery due to a discharge after the battery has been fully charged, the charge management function of the load causes the battery to be recharged automatically. Therefore, the battery can be easily recharged. Note that power-saving power transmission transmits only a small amount of power which merely maintains the battery charge management function of the load. Specifically, power consumption is sufficiently reduced during power-saving power transmission. The transmission frequency during power-saving power transmission is set at a frequency apart from the resonance frequency (resonance peak) as compared with the frequency during normal power transmission, for example. The power to be transmitted can also be reduced, even if the transmission frequency is the same, by increasing the frequency difference between the resonance frequency (resonance peak) and the transmission frequency by changing the resonance characteristics of the resonant circuit to change the resonance frequency (resonance peak).

(2) In the power transmission control device according to this embodiment, the load of the power reception device may include a charge control device that manages charging the battery; and the power transmission device may control power transmission so that the charge control device maintains an operating state, even after the battery has been fully charged, during the power-saving power transmission.

The load includes the charge control device that manages charging of the battery. The charge control device can maintain its operating state after the battery has been fully charged due to power-saving power transmission. Therefore, the battery can be easily recharged without providing a special configuration. The charge control device is a charge control IC, for example. The charge control device may be incorporated in the load (e.g., battery pack), or may be incorporated in the battery (e.g., smart battery). In either case, the load includes the charge control device (charge control IC).

(3) In the power transmission control device according to this embodiment, the power-transmission-side control circuit may change power transmission from the normal power transmission to the power-saving power transmission when receiving a save command that requests the power-saving power transmission from the power reception device.

The power transmission control device cannot determine whether or not the battery of the load of the power reception device has been fully charged. Therefore, the power reception device detects that the battery has been fully charged, and transmits a save command (i.e., information relating to the full-charge state of the battery) which requests power-saving power transmission. When the power transmission control device has received the save command, the power transmission control device changes power transmission from normal power transmission to power-saving power transmission.

(4) In the power transmission control device according to this embodiment, the power-transmission-side control circuit may monitor a load state of the power reception device during the power-saving power transmission; and when the power-transmission-side control circuit has detected that the load state of the power reception device has changed from a low-load state to a high-load state by starting recharge of the battery included in the load, the power-transmission-side control circuit may change power transmission from the power-saving power transmission to the normal power transmission.

When recharging of the battery has started due to the charge management function of the load during power-saving power transmission, it is necessary to transmit a sufficient amount of power from the power transmission device to the power reception device in order to continue to recharge the battery. Therefore, the power transmission control device monitors the load state of the power reception device with respect to the power transmission device. When the power reception device has changed to a high-load state due to recharging, the power transmission control device detects a change in load state, immediately changes power transmission from power-saving power transmission to normal power transmission, and transmits power necessary for recharging to the power reception device. Therefore, since a sufficient amount of power is supplied to the power reception device immediately after recharging has started, the power reception device can continue to recharge the battery. A change in the load state of the power reception device can be detected by monitoring a change in the amplitude of the induced voltage in the primary coil, for example. Specifically, when the power reception device has changed from a low-load state (power-saving state) to a high-load state (recharge state), the amplitude of the induced voltage in the primary coil increases. Therefore, the power transmission device can reliably detect a change in load state by determining a change in amplitude using the threshold value, for example. Note that the load state change detection method is not limited to the above method. Another method may also be used.

(5) In the power transmission control device according to this embodiment, the power-transmission-side control circuit may intermittently monitor the load state of the power reception device at given intervals during the power-saving power transmission.

The load state of the power reception device during power-saving power transmission may be always monitored. When a reduction in power consumption is desired, it is effective to intermittently monitor the load state of the power reception device. A change in the load state of the power reception device can be detected in almost real time by reducing the monitoring interval. This prevents a problem in which a delay in detection occurs.

(6) In the power transmission control device according to this embodiment, the power-transmission-side control circuit may change power transmission from the power-saving power transmission to the normal power transmission in a given cycle during the power-saving power transmission, and may monitor a response from the power reception device relating to the change from the power-saving power transmission to the normal power transmission;

the power-transmission-side control circuit again may change power transmission from the normal power transmission to the power-saving power transmission when receiving a save command that requests the power-saving power transmission from the power reception device; and when the power-transmission control circuit cannot receive the save command from the power reception device, the power-transmission-side control circuit may determine that the power reception device has been removed and stopping continuous power transmission.

Since an amount of power is continuously transmitted during power-saving mode power transmission, when the power reception device (e.g., portable telephone) has been removed in the power-saving mode, unnecessary power is always transmitted in the power-saving mode. This makes it impossible to deal with a demand for a reduction in power consumption. According to this embodiment, the power transmission device cyclically checks whether or not the power reception device exists (i.e., whether or not the power reception device has been removed) in the power-saving mode. Specifically, the power transmission control device regularly and temporarily cancels power-saving power transmission in the power-saving mode and causes the power transmission device to perform normal power transmission. When the power reception device has not been removed, the power reception device detects a change in power transmission frequency and transmits a response (e.g., returns a save command which requests recovery of power-saving power transmission) to the power transmission device. The power transmission control device changes power transmission from normal power transmission to power-saving power transmission upon reception of the response. When no response has been received, the power transmission control device determines that the power reception device has been removed and stops continuous power transmission to minimize unnecessary power consumption. Specifically, when no response has been received, the power transmission control device may cause the power transmission device to operate in an initial mode in which the power transmission device intermittently transmits power in order to detect whether or not the power reception device has been placed on the charger, for example (this measure is only an example). A situation in which the power transmission device continuously transmits power although the power reception device does not exists can be reliably prevented by regularly performing removal detection during power-saving power transmission, whereby unnecessary power consumption can be suppressed. Moreover, removal (leave) of the power reception device can be easily detected based on software without using a special hardware configuration by employing a method which changes power transmission from power-saving power transmission to normal power transmission and waits for response from the power reception device.

(7) According to another embodiment of the invention, there is provided a power reception control device provided in a power reception device of a non-contact power transmission system, the non-contact power transmission system transmitting power from a power transmission device to the power reception device by electromagnetically coupling a primary coil and a secondary coil to transmit the power to a load of the power reception device, the power reception control device comprising:

a power-reception-side control circuit that controls the power reception device, when a battery included in the load has been fully charged, the power-reception-side control circuit performing control that the power reception device transmits information that indicates that the battery has been fully charged to the power transmission device.

Since the power transmission device cannot determine whether or not the battery has been fully charged, it is necessary for the power reception device to transmit information relating to whether or not the battery has been fully charged to the power transmission device. Therefore, the power reception control device detects whether or not the battery of the load has been fully charged, and transmits information relating to whether or not the battery has been fully charged to the power transmission device. The term "information relating to whether or not the battery has been fully charged" used herein means information which indicates that the battery has been fully charged or information which indicates the charge level. The term "information relating to whether or not the battery has been fully charged" also includes the save command which requests power-saving power transmission. This enables the power transmission device to change power transmission from normal power transmission to power-saving power transmission.

(8) In the power reception control device according to this embodiment, the power-reception-side control circuit may perform control that the power reception device transmits a save command that requests power-saving power transmission to the power transmission device when the power reception control device has detected that the battery has been fully charged and a power transmission frequency of the power transmission device is a frequency other than a power-saving power transmission frequency.

The above description defines a specific save command transmission condition. Specifically, the save command is transmitted to the power transmission device when the battery has been fully charged (first condition) and the power transmission frequency from the power transmission device is a frequency other than the power-saving power transmission frequency (second condition). The first condition is a necessary condition because the save command is a request for power-saving power transmission as a result of detecting that the battery has been fully charged. The second condition is mainly necessary so that, when the frequency of power transmission from the power transmission device is regularly changed for detachment detection during power-saving power transmission, the power reception device can again transmit the save command to the power transmission device in response to the change in frequency. As described above, when an intentional change in transmission frequency has been detected, the power reception control device must notify (respond) the power transmission device that the power reception device has not been removed. The power reception control device transmits the save command as a response. Specifically, the power reception control device transmits the save command when the battery has been fully charged during normal power transmission (first case where the first and second conditions are satisfied) or when the transmission frequency has been changed to a frequency other than the frequency during power-saving power transmission after power-saving power transmission has started (battery has been fully charged) (second case where the first and second conditions are satisfied).

(9) In the power reception control device according to this embodiment, the power reception control device may further include:

a full-charge detection circuit that detects whether or not the battery has been fully charged; and a frequency detection circuit that detects the power transmission frequency of the power transmission device, the full-charge detection circuit may detect whether or not the battery has been fully charged based on an ON/OFF state of a light-emitting device that indicates a charge state of the battery; and the power-reception-side control circuit may determine whether or not the power transmission frequency of the power transmission device is a frequency other than the power-saving power transmission frequency based on a detection result of the frequency detection circuit.

Specifically, the full-charge detection circuit is provided in order to detect whether or not the battery has been fully charged, and the frequency detection circuit is provided in order to detect the power transmission frequency. The full-charge detection circuit detects whether or not the battery has been fully charged based on whether or not a light-emitting device (e.g., LED) provided to the load has been turned ON. For example, when the light-emitting device has been successively turned OFF for five minutes or more, the full-charge detection circuit determines that the battery has been fully charged (this method is only an example). Since whether or not the battery has been fully charged is determined utilizing the light-emitting device (e.g., LED), it is unnecessary to provide a special circuit in order to determine whether or not the battery has been fully charged. This simplifies the circuit configuration.

(10) In the power reception control device according to this embodiment, the full-charge detection circuit may determine that the battery has been fully charged when the light-emitting device has been successively turned OFF for a given period of time.

For example, when the light-emitting device has been successively turned OFF for five minutes or more, the full-charge detection circuit determines that the battery has been fully charged (this method is only an example). Since whether or not the battery has been fully charged is determined by checking the ON/OFF state of the light-emitting device for a given period of time, a situation can be prevented in which power-saving power transmission suddenly occurs even if the battery has not been fully charged.

(11) According to another embodiment of the invention, there is provided a non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power transmission device including a power-transmission-side control circuit that controls the power transmission device;

the power reception device including:

a power-reception-side control circuit that controls the power reception device;

a full-charge detection circuit that detects whether or not a battery has been fully charged; and a frequency detection circuit that detects a power transmission frequency of the power transmission device;

the load of the power reception device including:

the battery; and a charge control device that manages charging the battery, detects that the battery requires recharging after the battery has been fully charged, and recharges the battery;

the power-reception-side control circuit performing control that the power reception device transmits a save command that requests power-saving power transmission to the power transmission device when the full-charge detection circuit has detected that the battery included in the load has been fully charged and the frequency detection circuit has detected that a power transmission frequency of the power transmission device is a frequency other than a power-saving power transmission frequency;

the power-transmission-side control circuit changing power transmission from normal power transmission to the power-saving power transmission when receiving the save command from the power reception device during the normal power transmission;

the power-transmission-side control circuit monitoring a load state of the power reception device during the power-saving power transmission, and, when the power-transmission-side control circuit has detected that the load state of the power reception device has changed from a low-load state to a high-load state when recharging of the battery included in the load has started, the power-transmission-side control circuit changing power transmission from the power-saving power transmission to the normal power transmission; and the power-transmission-side control circuit changing power transmission from the power-saving power transmission to the normal power transmission in a given cycle during the power-saving power transmission, monitoring a response from the power reception device relating to the change from the power-saving power transmission to the normal power transmission, again changing power transmission from the normal power transmission to the power-saving power transmission when a save command that requests the power-saving power transmission has been received from the power reception device, and determining that the power reception device has been removed when the power-transmission-side control circuit cannot receive the save command from the power reception device and stopping continuous power transmission.

Power-saving power transmission enables the battery to be easily recharged utilizing the battery charge management function of the load. Moreover, since a change in load accompanying recharging is automatically detected so that necessary power is promptly supplied, recharging smoothly proceeds. In addition, unnecessary power transmission is automatically stopped due to detachment detection during power-saving power transmission, whereby power consumption is reduced. Therefore, a practical non-contact power transmission system which can be used without worry can be implemented. Since whether or not the battery has been fully charged is detected using the charge management function of the load and optionally using a charge level display function utilizing the light-emitting device, a convenient system which can utilize the existing elements can be formed. It suffices that the charge control device provided in the load to manage battery charging in the same manner as in the case of using an AC adaptor irrespective of whether or not non-contact power transmission is used or whether power transmission is normal power transmission or power-saving power transmission. This makes it unnecessary to change the specification of the load (e.g., battery pack) of the power reception device. This contributes to widespread use of this system.

(12) In the non-contact power transmission system according to this embodiment, the power transmission control device may intermittently monitor the load state of the power reception device at given intervals, the given intervals being shorter than intervals when the power-transmission-side control circuit cyclically changes power transmission from the power-saving power transmission to the normal power transmission during the power-saving power transmission.

According to this configuration, power consumption is reduced by causing the power transmission control device to intermittently monitor a change in load state accompanying recharging. Moreover, power consumption is also reduced by setting the interval of cyclically and compulsorily changing the frequency for detachment detection to be longer than the monitoring interval. Specifically, it is necessary to minutely monitor the load in order to promptly supply power when recharging has started. On the other hand, a problem does not occur even if detachment detection is delayed to a small extent. Therefore, the load is minutely monitored while changing the frequency at longer intervals. This optimizes the balance between a reduction in power consumption and a detection delay.

(13) According to another embodiment, there is provided a power transmission device comprising:

the above power transmission control device; and a power transmission section that generates an alternating voltage and supplies the alternating voltage to the primary coil.

This implements a power transmission device which achieves appropriate power-saving power transmission.

(14) According to another embodiment of the invention, there is provided a power reception device comprising:

the above power reception control device; and a power receiving section that converts an induced voltage in a secondary coil into a direct voltage.

This implements a power reception device which achieves appropriate power-saving power reception.

(15) According to another embodiment of the invention, there is provided an electronic instrument comprising the above power transmission device This enables a battery of an electronic instrument (e.g., portable terminal) which performs non-contact power transmission to be easily recharged while reducing power consumption, whereby the performance of the electronic instrument can be increased while increasing convenience.

(16) According to another embodiment of the invention, there is provided an electronic instrument comprising:

the above power reception device; and a load, power being supplied to the load from the power reception device.

This enables an electronic instrument as a charger (e.g., cradle) which performs non-contact power transmission to be provided with a power-saving power transmission function. Therefore, a battery of a power reception device can be easily recharged while reducing power consumption, whereby the performance of the electronic instrument can be increased while increasing convenience.

As described above, some embodiments of the invention enable a battery of a load to be recharged after the battery has been fully charged utilizing non-contact power transmission, and can easily implement such recharging.

Embodiments of the invention are described below with reference to the drawings. Note that the embodiments described below do not in any way limit the scope of the invention defined by the claims laid out herein. Note that all elements of the embodiments described below should not necessarily be taken as essential requirements for the invention.

First Embodiment

Electronic Instrument

Figure 1B:
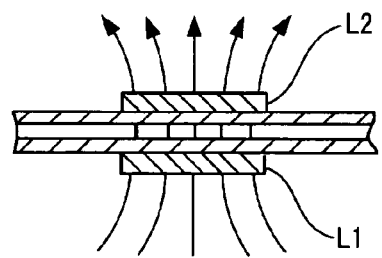

FIGS. 1A and 1B are views showing examples of electronic instruments utilizing non-contact power transmission. FIG. 1A is an oblique view showing a state in which a portable telephone as a power reception device is placed on a charger (cradle) as a power transmission device, and FIG. 1B is a cross-sectional view showing the main portion of electronic instruments, illustrative of the principle of power transmission from a power transmission device to a power reception device.

As shown in FIG. 1A, a charger 500 (cradle) (i.e., electronic instrument) includes a power transmission device 10. A portable telephone 510 (i.e., electronic instrument) includes a power reception device 40. The portable telephone 510 also includes a display section 512 such as a liquid crystal display (LCD), an operation section 514 which includes a button or the like, a microphone 516 (sound input section), a speaker 518 (sound output section), and an antenna 520.

Power is supplied to the charger 500 through an AC adaptor 502. The power supplied to the charger 500 is transmitted from the power transmission device 10 to the power reception device 40 by means of non-contact power transmission. This makes it possible to charge a battery of the portable telephone 510 or operate a device provided in the portable telephone 510.

The electronic instrument to which this embodiment is applied is not limited to the portable telephone 510. For example, this embodiment may be applied to various electronic instruments such as a wristwatch, a cordless telephone, a shaver, an electric toothbrush, a wrist computer, a handy terminal, a portable information terminal, and a power-assisted bicycle.

As schematically shown in FIG. 1B, power transmission from the power transmission device 10 to the power reception device 40 is implemented by electromagnetically coupling a primary coil L1 (power-transmission-side coil) provided in the power transmission device 10 and a secondary coil L2 (power-receiving-side coil) provided in the power reception device 40 to form a power transmission transformer. This enables non-contact power transmission.

Figure 2:
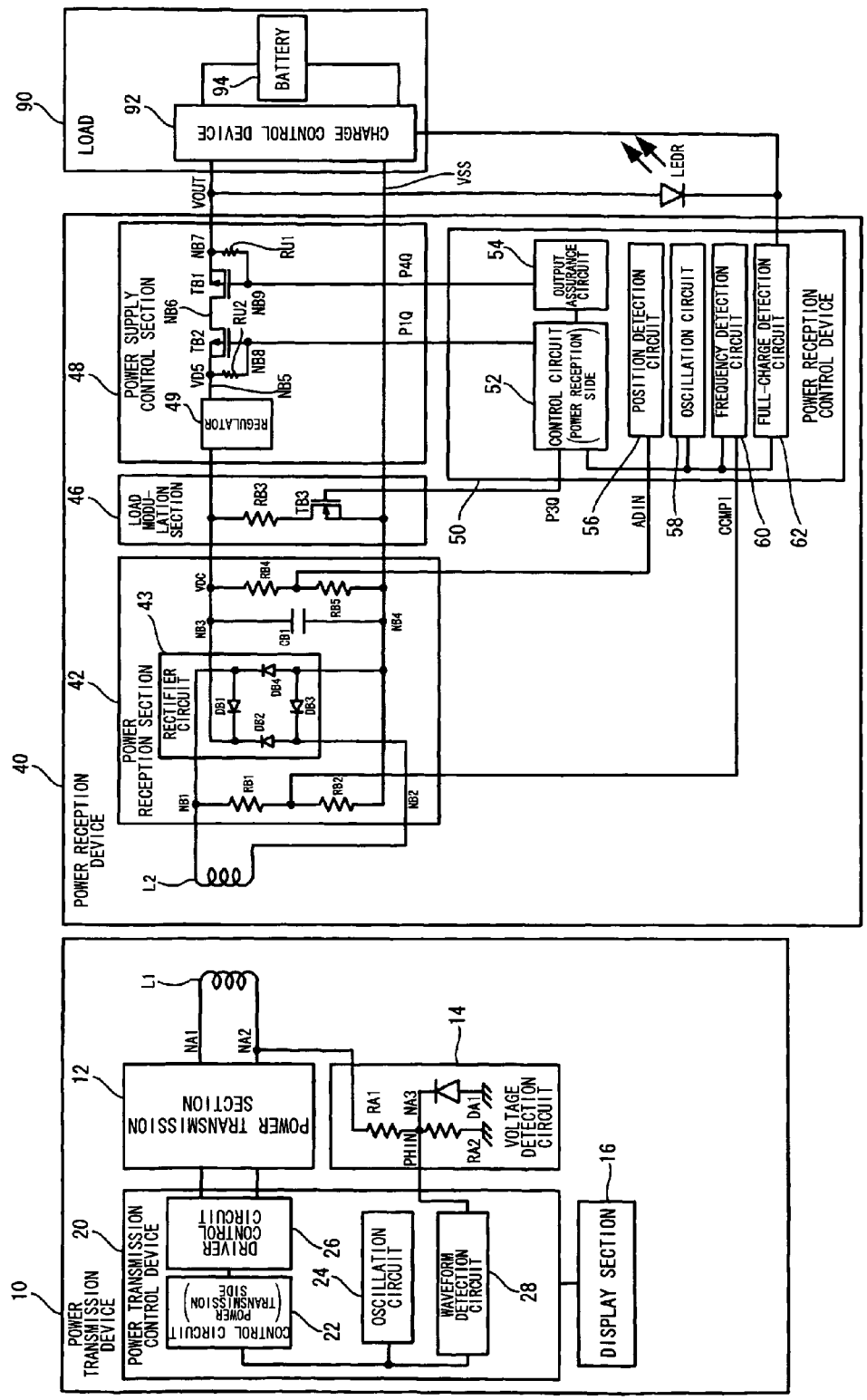
FIG. 2 is a view showing an example of a specific configuration of a power transmission device, a power transmission control device, a power reception device, and a power reception control device according to the invention.

Specific configuration example of power transmission device, power transmission control device, power reception device, and power reception control device FIG. 2 is a view showing an example of a specific configuration of a power transmission device, a power transmission control device, a power reception device, and a power reception control device according to the invention.

A power-transmission-side electronic instrument such as the charger 500 shown in FIG. 1A includes at least the power transmission device 10 shown in FIG. 2. A power-receiving-side electronic instrument such as the portable telephone 510 includes at least the power reception device 40 and a load 90 (actual load). The configuration shown in FIG. 2 implements a non-contact power transmission (contactless power transmission) system in which power is transmitted from the power transmission device 10 to the power reception device 40 by electromagnetically coupling the primary coil L1 and the secondary coil L2, and power (voltage VOUT) is supplied to the load 90 from a voltage output node NB7 of the power reception device 40.

The power transmission device 10 (power transmission module or primary module) may include the primary coil L1, a power transmission section 12, a voltage detection circuit 14, a display section 16, and a power transmission control device 20. The power transmission device 10 and the power transmission control device 20 are not limited to the configuration shown in FIG. 2. Various modifications may be made such as omitting some elements (e.g., display section and voltage detection circuit), adding other elements, or changing the connection relationship.

Figure 3A:
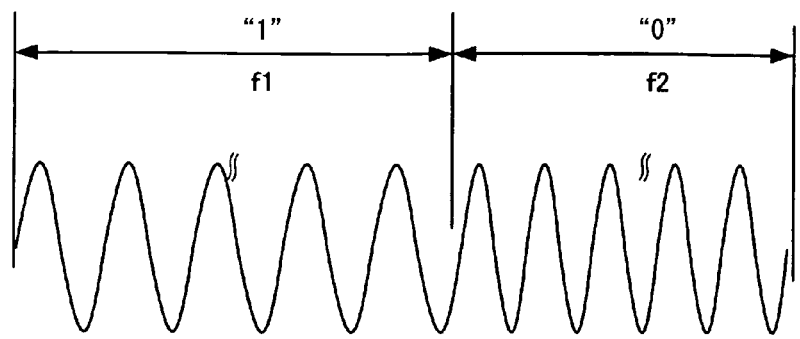
FIGS. 3A and 3B are views illustrative of the principle of information transmission from a primary-side instrument to a secondary-side instrument or from the secondary-side instrument to the primary-side instrument.
Figure 3B:
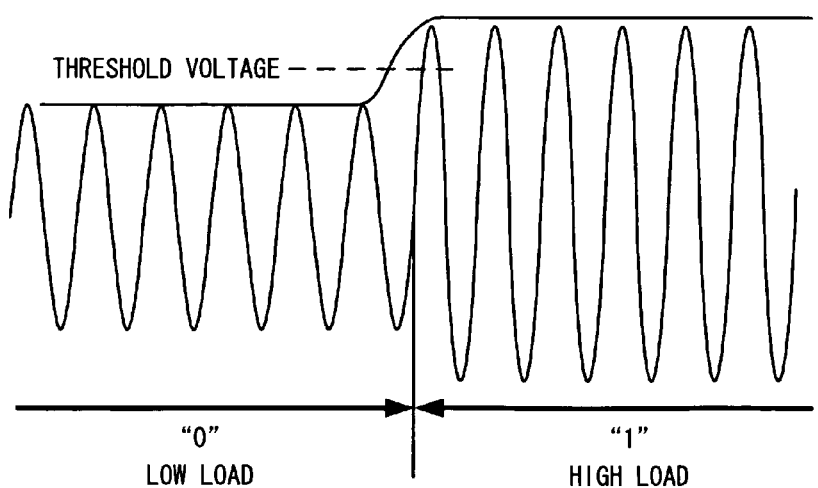

The power transmission section 12 generates an alternating-current voltage at a given frequency during power transmission, and generates an alternating-current voltage at a frequency which differs depending on data during data transfer. The power transmission section 12 supplies the generated alternating-current voltage to the primary coil L1. FIGS. 3A and 3B are views illustrative of the principle of information transmission from the primary-side instrument to the secondary-side instrument or from the secondary-side instrument to the primary-side instrument.

As shown in FIG. 3A, the power transmission section 12 generates an alternating-current voltage at a frequency f1 when transmitting data "1" to the power reception device 40, and generates an alternating-current voltage at a frequency f2 when transmitting data "0" to the power reception device 40, for example.

The power transmission section 12 may include a first power transmission driver which drives one end of the primary coil L1, a second power transmission driver which drives the other end of the primary coil L1, and at least one capacitor which forms a resonant circuit together with the primary coil L1.

Each of the first and second power transmission drivers included in the power transmission section 12 is an inverter circuit (or buffer circuit) which includes a power MOS transistor, for example, and is controlled by a driver control circuit 26 of the power transmission control device 20.

The primary coil L1 (power-transmission-side coil) is electromagnetically coupled with the secondary coil L2 (power-receiving-side coil) to form a power transmission transformer. For example, when power transmission is necessary, the portable telephone 510 is placed on the charger 500 so that a magnetic flux of the primary coil L1 passes through the secondary coil L2, as shown in FIGS. 1A and 1B.

When power transmission is unnecessary, the charger 500 and the portable telephone 510 are physically separated so that a magnetic flux of the primary coil L1 does not pass through the secondary coil L2.

The voltage detection circuit 14 is a circuit which detects the induced voltage in the primary coil L1. The voltage detection circuit 14 includes resistors RA1 and RA2 and a diode DA1 provided between a connection node NA3 of the resistors RA1 and RA2 and a power supply GND (low-potential-side power supply in a broad sense), for example. Specifically, a signal PHIN obtained by dividing the induced voltage in the primary coil L1 using the resistors RA1 and RA2 is input to a waveform detection circuit 28 of the power transmission control device 20.

The display section 16 displays the state (e.g., power transmission or ID authentication) of the non-contact power transmission system using a color, an image, or the like. The display section 16 is implemented by an LED, an LCD, or the like.

The power transmission control device 20 is a device which controls the power transmission device 10. The power transmission control device 20 may be implemented by an integrated circuit device (IC) or the like. The power transmission control device 20 may include a power-transmission-side control circuit 22, an oscillation circuit 24, a driver control circuit 26, and the waveform detection circuit 28.

The power-transmission-side control circuit 22 controls the power transmission device 10 and the power transmission control device 20. The power-transmission-side control circuit 22 may be implemented by a gate array, a microcomputer, or the like. Specifically, the power-transmission-side control circuit 22 performs sequence control and a determination process necessary for power transmission, load detection, frequency modulation, foreign object detection, detachment detection, and the like.

The oscillation circuit 24 includes a crystal oscillation circuit, for example. The oscillation circuit 24 generates a primary-side clock signal. The driver control circuit 26 generates a control signal at a desired frequency based on the clock signal generated by the oscillation circuit 24, a frequency setting signal from the control circuit 22, and the like, and outputs the generated control signal to power transmission drivers DR1 and DR2 of the power transmission section 12 to control the power transmission drivers DR1 and DR2.

The waveform detection circuit 28 monitors the waveform of the signal PHIN which corresponds to the induced voltage at one end of the primary coil L1, and performs load detection, foreign object detection, and the like. For example, when a load modulation section 46 of the power reception device 40 modulates load in order to transmit data to the power transmission device 10, the signal waveform of the induced voltage in the primary coil L1 changes as shown in FIG. 3B.

Specifically, the amplitude (peak voltage) of the signal waveform decreases when the load modulation section 46 reduces load in order to transmit data "0", and the amplitude of the signal waveform increases when the load modulation section 46 increases load in order to transmit data "1".

Therefore, the waveform detection circuit 28 can determine whether the data from the power reception device 40 is "0" or "1" by determining whether or not the peak voltage has exceeded a threshold voltage as a result of a peak-hold process on the signal waveform of the induced voltage, for example. Note that the waveform detection method is not limited to the method shown in FIGS. 3A and 3B. For example, the waveform detection circuit 28 may determine whether the power-receiving-side load has increased or decreased using a physical quantity other than the peak voltage.

The power reception device 40 (power reception module or secondary module) may include the secondary coil L2, a power reception section 42, the load modulation section 46, a power supply control section 48, and a power reception control device 50. The power reception device 40 and the power reception control device 50 are not limited to the configuration shown in FIG. 2. Various modifications may be made such as omitting some elements, adding other elements, or changing the connection relationship.

The power reception section 42 converts an alternating-current induced voltage in the secondary coil L2 into a direct-current voltage. A rectifier circuit 43 included in the power reception section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node), the diode DB2 is provided between the node NB3 and a node NB2 at the other end of the secondary coil L2, the diode DB3 is provided between the node NB2 and a node NB4 (VSS), and the diode DB4 is provided between the nodes NB4 and NB1.

Resistors RB1 and RB2 of the power reception section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power reception section 42 are provided between the node NB3 (direct-current voltage VDC) and the node NB4 (VSS). A signal ADIN obtained by dividing the voltage between the nodes NB3 and NB4 using the resistors RB4 and RB5 is input to a position detection circuit 56 of the power reception control device 50.

The load modulation section 46 performs a load modulation process. Specifically, when the power reception device 40 transmits desired data to the power transmission device 10, the load modulation section 46 variably changes the load of the load modulation section 46 (secondary side) depending on transmission data to change the signal waveform of the induced voltage in the primary coil L1 as shown in FIG. 3B.

The load modulation section 46 includes a resistor RB3 and a transistor TB3 (N-type CMOS transistor) provided in series between the nodes NB3 and NB4. The transistor TB3 is ON/OFF-controlled based on a signal P3Q from a control circuit 52 of the power reception control device 50. When performing load modulation by ON/OFF-controlling the transistor TB3, transistors TB1 and TB2 of the power supply control section 48 are turned OFF so that the load 90 is electrically disconnected from the power reception device 40.

For example, when reducing the secondary-side load (high impedance) in order to transmit data "0" (see FIG. 3B), the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 becomes the resistor RB3 (high load).

The power supply control section 48 controls power supplied to the load 90. A regulator 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

The transistor TB2 (P-type CMOS transistor) is provided between a node NB5 (power supply voltage VD5 generation node) (output node of the regulator 49) and the transistor TB1 (node NB6), and is controlled based on a signal P1Q from the control circuit 52 of the power reception control device 50.

Specifically, the transistor TB2 is turned ON when ID authentication has been completed (established) and normal power transmission is performed, and is turned OFF during load modulation or the like. A pull-up resistor RU2 is provided between the power supply voltage generation node NB5 and a node NB8 of the gate of the transistor TB2.

The transistor TB1 (P-type CMOS transistor) is provided between the transistor TB2 (node NB6) and the voltage VOUT output node NB7, and is controlled based on a signal P4Q from an output assurance circuit 54. Specifically, the transistor TB1 is turned ON when ID authentication has been completed and normal power transmission is performed. The transistor TB1 is turned OFF when connection of an AC adaptor has been detected or the power supply voltage VD5 is lower than the operation lower limit voltage of the power reception control device 50 (control circuit 52), for example. A pull-up resistor RU1 is provided between the voltage output node NB7 and a node NB9 of the gate of the transistor TB1.

The power reception control device 50 is a device which controls the power reception device 40. The power reception control device 50 may be implemented by an integrated circuit device (IC) or the like. The power reception control device 50 may operate based on the power supply voltage VD5 generated from the induced voltage in the secondary coil L2. The power reception control device 50 may include the power-receiving-side control circuit 52, the output assurance circuit 54, the position detection circuit 56, an oscillation circuit 58, the frequency detection circuit 60, a full-charge detection circuit 62, and a recharge monitoring circuit 64.

The power-receiving-side control circuit 52 controls the power reception device 40 and the power reception control device 50. The power reception control circuit 52 may be implemented by a gate array, a microcomputer, or the like. Specifically, the control circuit 22 performs sequence control and a determination process necessary for ID authentication, position detection, frequency detection, load modulation, full-charge detection, recharge monitoring, and the like.

The output assurance circuit 54 is a circuit which assures the output from the power reception device 40 when the voltage is low (0 V). For example, when connection of an AC adaptor has been detected or the power supply voltage VD5 is lower than the operation lower limit voltage, for example, the output assurance circuit 54 causes the transistor TB1 to be turned OFF to prevent a backward current flow from the voltage output node NB7 to the power reception device 40.

The position detection circuit 56 monitors the waveform of the signal ADIN which corresponds to the waveform of the induced voltage in the secondary coil L2, and determines whether or not the positional relationship between the primary coil L1 and the secondary coil L2 is appropriate. Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit, for example. The oscillation circuit 58 generates a secondary-side clock signal. The frequency detection circuit 60 detects the frequency (f1 or f2) of the signal CCMPI, and determines whether the data transmitted from the power transmission device 10 is "1" or "0", as shown in FIG. 3A.

The full-charge detection circuit 62 (charge detection circuit) is a circuit which detects whether or not a battery 94 of the load 90 has been fully charged (charging has been completed).

Specifically, the full-charge detection circuit 62 detects the full-charge state by detecting whether a light-emitting device (LEDR) (i.e., charge state indicator) used to display the charge state is turned ON or OFF, for example. The full-charge detection circuit 62 determines that the battery (secondary battery) 94 is in a full-charge state (charging has been completed) when the light-emitting device LEDR has been turned OFF for a given period of time (e.g., five seconds).

The load 90 includes a charge control device (charge control IC) 92 which controls charging the battery (secondary battery) 94 and the like. The charge control device 92 (charge control IC) is provided in a battery pack, for example. The charge control device 92 may be incorporated in the battery (secondary battery) 94 (e.g., smart battery).

The charge control device (charge control IC) 92 has a charge management function. Specifically, the charge control device (charge control IC) 92 has a function of accurately detecting the charge level of the battery (secondary battery) 94, an overcharge prevention function (i.e., function of causing the switch provided in the power supply path to be turned OFF to stop supplying power when the battery has been fully charged), and a recharge function (i.e., function of causing the switch provided in the power supply path to be turned ON to start recharging the battery when the voltage of the battery has decreased to a value lower than a given threshold value after the battery has been fully charged), for example.

Since the charge control device (charge control IC) 92 plays an important role which enables proper charge management and safe handling of the battery 94, a rechargeable load (e.g., battery pack) is generally provided with the functions (i.e., charge level detection function, overcharge prevention function, and recharge management function) of the charge control device (charge control IC) 92.

The load 90 includes a light-emitting diode (LEDR) as a charge indicator. When a charge voltage (Vout) is supplied to the battery 94, the light-emitting device (light-emitting diode: LEDR) emits light using the charge voltage (Vout) as a power supply voltage. The method of displaying a charge state by causing a light-emitting device (LEDR) to emit light is employed in most chargers. This method is widely used in practice.

Outline of Power-Saving Mode
Basic Function of Power-Saving Mode

In the invention, continuous transmission of power lower than that during normal power transmission is performed after the battery 94 has been fully charged so that power (power supply voltage) is supplied to the charge control device (charge control IC) 92 after the battery 94 has been fully charged to maintain the operating state of the charge control device (charge control IC) 92, thereby enabling recharging. The power to be transmitted may be reduced by changing a transmission frequency (i.e., frequency of a drive clock signal of the power transmission section). The power to be transmitted may be reduced without changing the transmission frequency by using a variable inductance coil or a variable capacitance capacitor as the element of the resonant circuit, and changing the resonance characteristics of the resonant circuit by changing the inductance or the capacitance to change the resonance frequency (resonance peak). Specifically, the power value of the resonant circuit becomes a maximum at the resonance peak, and decreases as the resonance frequency moves away from the resonance peak. Therefore, the power to be transmitted can be reduced, even if the frequency is the same as the frequency during normal power transmission, by increasing the distance (i.e., frequency difference) between the transmission frequency and the resonance peak by changing the resonance characteristics, whereby power-saving power transmission can be implemented. The method of implementing power-saving power transmission by reducing the power to be transmitted without changing the transmission frequency has an advantage in that undesirable radiation noise which occurs due to a change in transmission frequency can be prevented.

A power transmission mode in which a small amount of power which can maintain the charge control device (charge control IC) 92 in an operating state is continuously transmitted from the power transmission device to the power reception device after the battery has been fully charged is referred to as "power-saving mode", and power transmission in the power-saving mode is referred to as "power-saving power transmission". The charge control device (charge control IC) 92 may be incorporated in the load (e.g., battery pack), or the charge control device may be incorporated in the battery (e.g., smart battery). In either case, the load includes the charge control device 92 (has the charge management function of the charge control device).

The power-saving mode is a mode which mainly enables recharging the battery after the battery has been fully charged while reducing power consumption (power saving) by suppressing unnecessary power transmission.

Specifically, when the portable telephone 510 is placed on the charger 500 (cradle) and power is transmitted from the power transmission device 10 to the power reception device 40 to charge the battery (secondary battery) 94, as shown in FIG. 1A, the battery 94 becomes fully charged with the passage of time, and the charge operation is then stopped. When the battery 94 is continuously placed on the charger 500, the voltage of the battery 94 gradually decreases with the passage of time so that the battery 94 must be recharged. When the battery 94 must be recharged, it is desirable to supply power from the power transmission device 10 to the power reception device 40 to recharge the battery 94.

In order to enable the charge control device 92 to detect whether or not the battery 94 must be recharged and start recharging as required, it is necessary to maintain the charge control device 92 in an operating state by supplying power (power supply voltage) to the charge control device 92 after the battery 94 has been fully charged. Specifically, power must be continuously supplied from the power transmission device 10 to the power reception device 40 after the battery has been fully charged so that the charge control device 92 is not reset.

Specifically, when power transmission from the power transmission device is completely stopped as in the technologies disclosed in JP-A-6-339232 and JP-A-11-146569, since the recharge function of the charge control measures 92 is turned OFF, it becomes impossible to recharge the battery.

In other words, if a power supply voltage (e.g., about 5 V) which maintains the charge control device (charge control IC) 92 in an operating state (a smart battery can maintain the function of the charge control device 92 in an ON state) is constantly transmitted from the power transmission device after the battery has been fully charged, the charge control device (charge control IC) 92 can perform the basic operation such as charge level monitoring, recharge control, and overcharge protection in the same manner as during charging. Therefore, the battery 94 can be easily recharged.

In the invention, a small amount of power is continuously transmitted in the power-saving mode after the battery has been fully charged based on the above consideration. Therefore, whether or not recharging is necessary can be determined and recharging can be started after the battery has been fully charged without adding a special configuration.

Frequency Used in Power-Saving Mode

Figure 4:
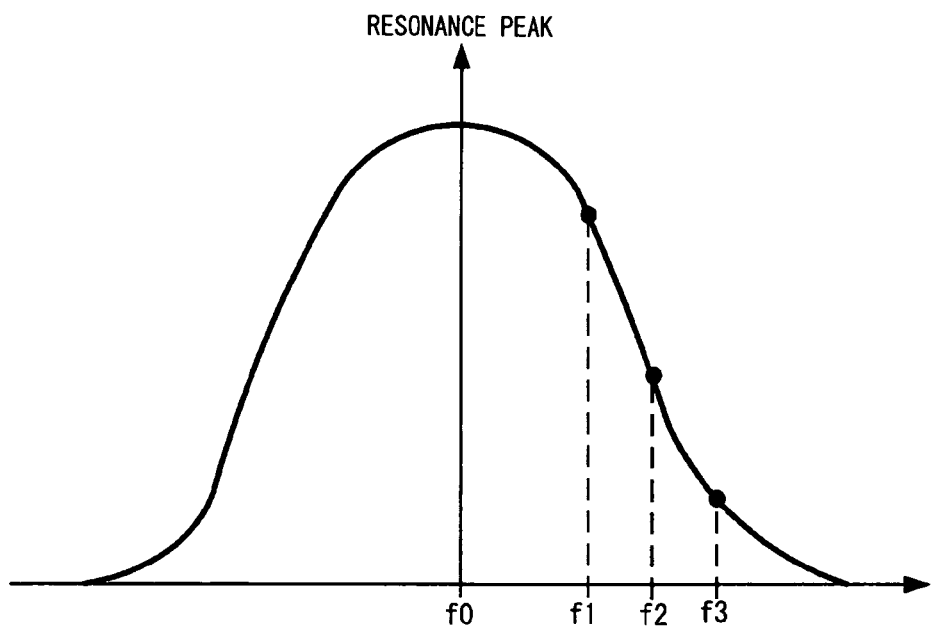
FIG. 4 is a view showing the resonance characteristics of an induction coil and applications of frequencies.

FIG. 4 is a view showing the resonance characteristics of the induction coil and applications of frequencies. The resonance characteristics of the primary coil L1 and the secondary coil L2 when the portable telephone 510 is placed on the charger 500 (cradle) (i.e., when load exists with respect to the power transmission device 10) (see FIG. 1A) have a symmetrical and broad mountain shape, as shown in FIG. 4, for example. In FIG. 4, the horizontal axis indicates the frequency, and the vertical axis indicates the resonance peak value.

In FIG. 4, the frequency f1 is a frequency used when transmitting "1" during normal power transmission. The frequency f1 is a basic frequency during power transmission. The frequency f2 is a frequency used when transmitting "0" (see FIGS. 3A and 3B). A frequency f3 is a frequency used in the power-saving mode. As is clear from FIG. 4, the relationship "f1>f2>f3" is satisfied.

Charging Mode Recovery Operation when Recharging has Started in Power-Saving Mode When the charge control device (charge control IC) 92 has started a recharge operation in the power-saving mode, it is necessary to cancel the power-saving mode and quickly recover (restart) power transmission in the transmission mode (charging mode) during normal charging in order to continuously supply a sufficient amount of charging current.

In the invention, a quick recovery from the power-saving mode to the charging mode is easily implemented. A quick recovery from the power-saving mode to the charging mode is implemented as follows, for example.

When the charge control device (charge control IC) 92 has started recharging the battery 94 in the power-saving mode, the amount of current which flows through the power supply path of the power supply control section 48 increases rapidly so that the load increases. Specifically, the amount of charging current increases, and the voltage of the input terminal of the regulator 49 which functions as a power supply circuit decreases. This phenomenon may be considered to mean that load modulation has occurred due to recharging.

As described with reference to FIGS. 3A and 3B, the signal waveform of the induced voltage in the primary coil L1 of the power transmission device 10 changes as shown in FIG. 3B depending on the degree of load of the power reception device 40. Specifically, the amplitude of the signal waveform of the primary coil L1 increases as the load of the power reception device 40 increases. Therefore, the power transmission device 10 can detect that the power reception device has changed from a low-load state to a high-load state (i.e., recharging has started in the power-saving mode) by causing the waveform detection circuit 28 of the power transmission device 10 to determine whether or not the peak voltage has exceeded a threshold voltage as a result of a peak-hold process on the signal waveform of the induced voltage, for example. This causes the power transmission control device 20 of the power transmission device 10 to switch the mode from the power-saving mode to the normal charging mode so that full-power power transmission starts, for example. This enables the power reception device 40 to continue to recharge the battery 94.

If the waveform detection circuit 28 of the power transmission device 10 cyclically monitors a change in the load of the power reception device 40 (change from a low-load state to a high-load state) at short intervals, for example, the waveform detection circuit 28 can immediately detect that recharging has started in the power-saving mode so that the mode can be quickly changed to the charging mode. In this case, since the waveform detection circuit 28 intermittently monitors a change in load, an increase in power consumption of the waveform detection circuit 28 is suppressed. Note that the waveform detection circuit 28 may constantly monitor a change in load. This has an advantage in that the start of recharging can be detected in real time.

Detection of Removal of Power Reception Device in Power-Saving Mode

Since power is continuously transmitted in the power-saving mode although the amount of power transmitted is small, when the power reception device (e.g., portable telephone) 40 has been removed in the power-saving mode, unnecessary power is always transmitted in the power-saving mode. This makes it impossible to deal with a demand for a reduction in power consumption.

Specifically, when transmitting power in the power-saving mode, it is necessary to cancel the power-saving mode and stop continuous power transmission after the power reception device 40 has been removed.

According to a preferred embodiment of the invention, the power transmission device cyclically checks whether or not the power reception device 40 exists (i.e., whether or not the power reception device 40 has been removed) in the power-saving mode.

Specifically, the power transmission control device 20 regularly and temporarily cancels the power-saving mode and causes the power transmission device 10 to operate in the normal charging mode. When the power reception device has not been removed, the power reception device 40 detects a change in power transmission frequency and transmits a response (e.g., returns a save command which requests recovery of power-saving power transmission) to the power transmission device 10. The power transmission control device 20 changes power transmission from normal power transmission to power-saving power transmission upon reception of the response. When no response has been received, the power transmission control device 20 determines that the power reception device 40 has been removed and stops continuous power transmission to minimize unnecessary power consumption.

Specifically, when no response has been received, the power transmission control device 20 may cause the power transmission device 10 to operate in an initial mode in which the power transmission device 10 intermittently transmits power in order to detect whether or not the power reception device 40 has been placed on the charger, for example (this measure is only an example). A situation in which the power transmission device 10 continuously transmits power although the power reception device 40 does not exists can be reliably prevented by regularly performing removal detection during power-saving power transmission, whereby unnecessary power consumption can be suppressed. Moreover, removal (leave) of the power reception device can be easily detected based on software without using a special hardware configuration by employing a method which changes power transmission from power-saving power transmission to normal power transmission and waits for response from the power reception device.

Configuration which Implements Power-Saving Mode

Figure 5:
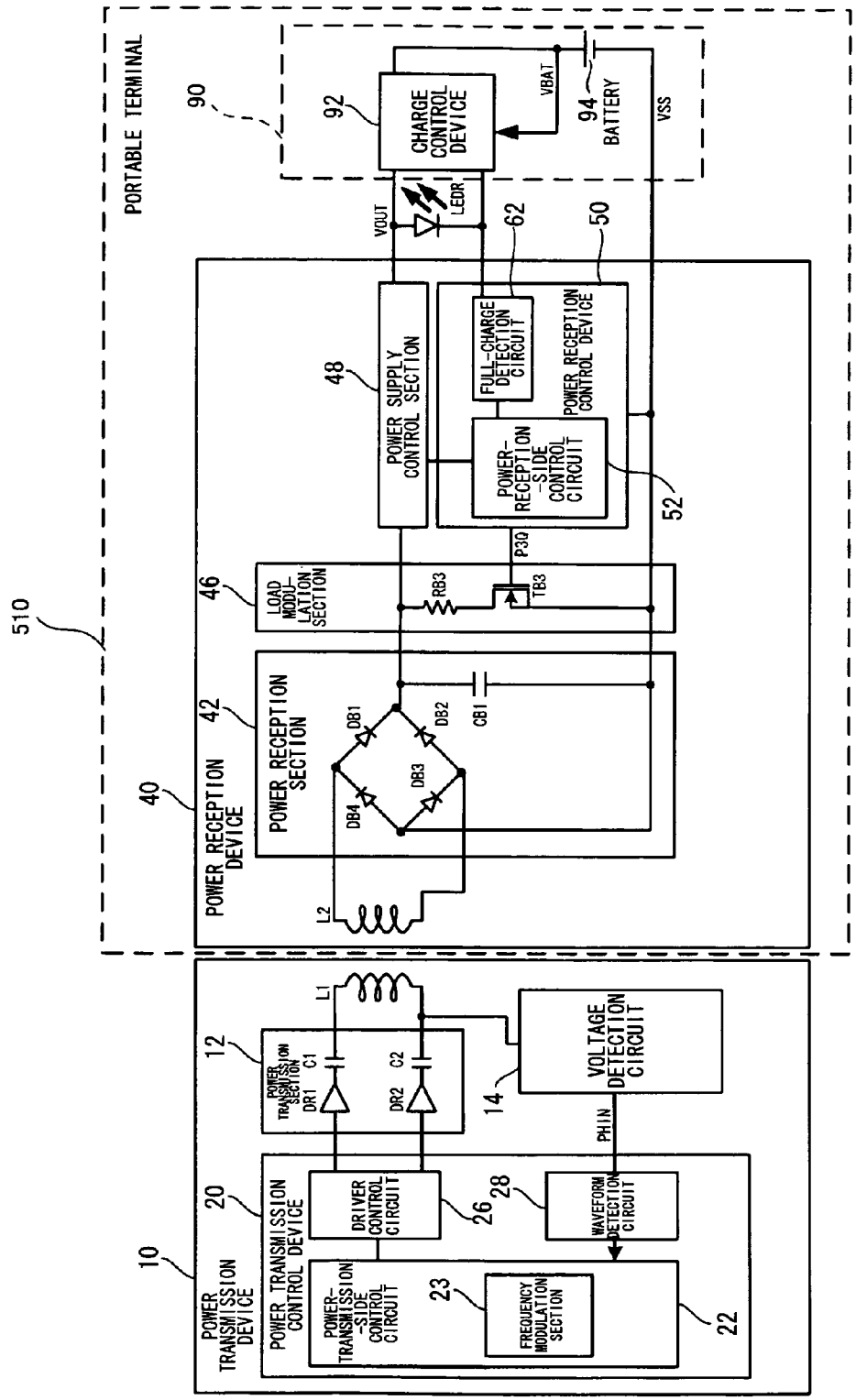
FIG. 5 is a block diagram selectively showing the configuration of a non-contact power transmission system shown in FIG. 2 relating to implementation of a power-saving mode.

FIG. 5 is a block diagram selectively showing the configuration of the non-contact power transmission system shown in FIG. 2 relating to implementation of the power-saving mode.

The power transmission control device 20 included in the power transmission device 10 implements normal power transmission or power-saving power transmission depending on the charge state of the battery 94 of the load 90. The power transmission control device 20 includes the power-transmission-side control circuit 22 which includes a frequency modulation section 23, the driver control circuit 26, and the waveform detection circuit 28.

The power transmission section 12 generates an alternating-current voltage and drives the primary coil (L1). The voltage detection circuit 14 detects the voltage induced in the primary coil (L1).

Figure 6:
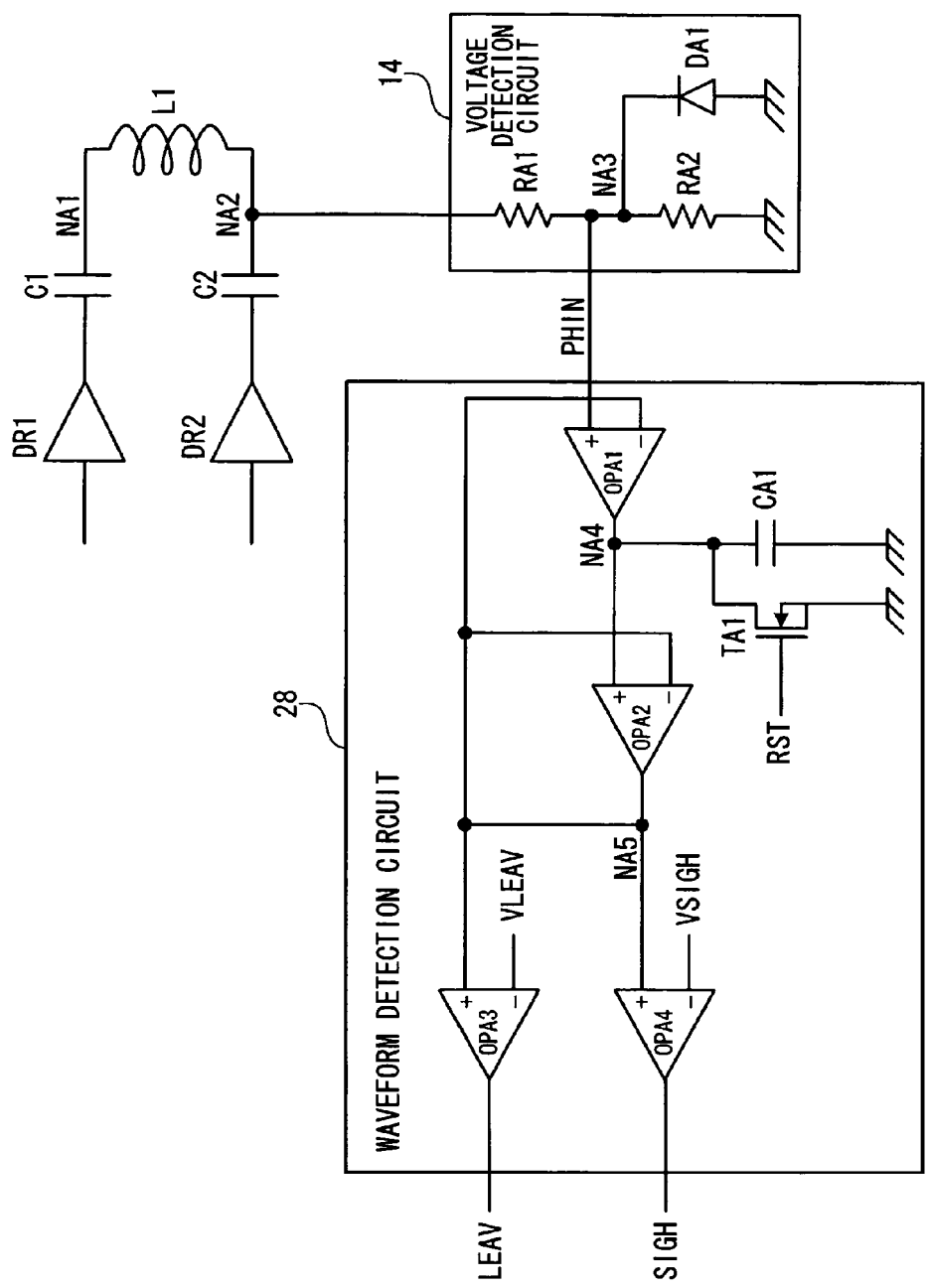
FIG. 6 is a circuit diagram showing an example of an internal circuit configuration of a voltage detection circuit and a waveform detection circuit shown in FIG. 5.

FIG. 6 is a circuit diagram showing an example of an internal circuit configuration of the voltage detection circuit and the waveform detection circuit shown in FIG. 5.

As shown in FIG. 6, the voltage detection circuit 14 includes voltage-division resistors RA1 and RA2 and a diode DA1 of which the cathode is connected to a common connection node NA3 of the voltage-division resistors RA1 and RA2.

The waveform detection circuit 28 includes operational amplifiers OPA1 to OPA4 (comparators), a capacitor CA1, and a reset N-type transistor TA1. The operational amplifiers OPA1 and OPA2, the capacitor CA1, and the transistor TA1 form a peak detection circuit. Specifically, the peak voltage of the detection signal PHIN from the voltage detection circuit 14 is held by a node NA4, and the peak voltage signal held by the node NA4 is subjected to impedance conversion by the voltage-follower-connected operational amplifier OPA2 and is output to a node NA5. The peak voltage signal held by the node NA4 is reset by the transistor TA1.

The operational amplifier OPA4 which forms a data detection circuit compares the peak voltage signal at the node NA5 with a data detection threshold voltage VSIGH, and outputs a data signal SIGH ("0" or "1"). The operational amplifier OPA3 which forms a detachment detection circuit compares the peak voltage signal at the node NA5 with a detachment detection threshold voltage VLEAV, and outputs a detachment detection signal LEAV. The configuration of the waveform detection circuit 28 is not limited to the configuration shown in FIG. 6. Various modifications may be made such as omitting some elements or adding other elements.

The configuration of the power reception device is described below with reference to FIG. 5. The power reception device 40 is provided in the portable terminal (including portable telephone terminal, PDA terminal, and portable computer terminal) 510 as an electronic instrument. The power reception device 40 includes the power reception section 42, the load modulation section 46, the power supply control section 48, and the power reception control device 50 (including the power-receiving-side control circuit 52 and the full-charge detection circuit 62).

The load 90 is a battery pack, for example. The load 90 includes the charge control device (charge control IC) 92 and the battery (secondary battery) 94. The light-emitting device (LEDR) as a charge level indicator may be provided in the load 90, or may be provided in the power reception device 40, or may be provided separately from the load 90 and the power reception device 40.

The charge control device (charge control IC) 92 has a charge management function. The term "charge management function" includes at least a charge level detection function/charge level indicator function (i.e., function of controlling the on-operation of the light-emitting device LEDR), an overcharge prevention function, and a recharge management function of starting recharging when the battery voltage has decreased to a value lower than a given value. In recent years, a charge control device (charge control IC) 92 having such functions is generally provided to a secondary battery in order to provide safe charge management. The invention focuses on this point and implements appropriate power-saving power transmission directly utilizing the functions of the charge control device (charge control IC) 92 to enable the battery 94 to be easily recharged.

The full-charge detection circuit 62 included in the power reception device 40 determines that the battery 94 has been fully charged when the light-emitting device (LEDR) has been turned OFF for five seconds or more, for example. Since the full-charge detection circuit 62 determines whether or not the battery 94 has been fully charged based on the state of the light-emitting device (LEDR) as a charge level indicator (i.e., whether or not a current flows through the light-emitting device), whether or not the battery 94 has been fully charged can be easily determined without providing a special circuit. This means that the invention fully utilizes existing circuit elements.

Although not shown in FIG. 5, the frequency detection circuit 60 included in the power reception device 40 shown in FIG. 2 plays an important role of detecting a compulsory change in transmission frequency for removal detection from the power transmission device 10 in the power-saving mode.

Figure 7:
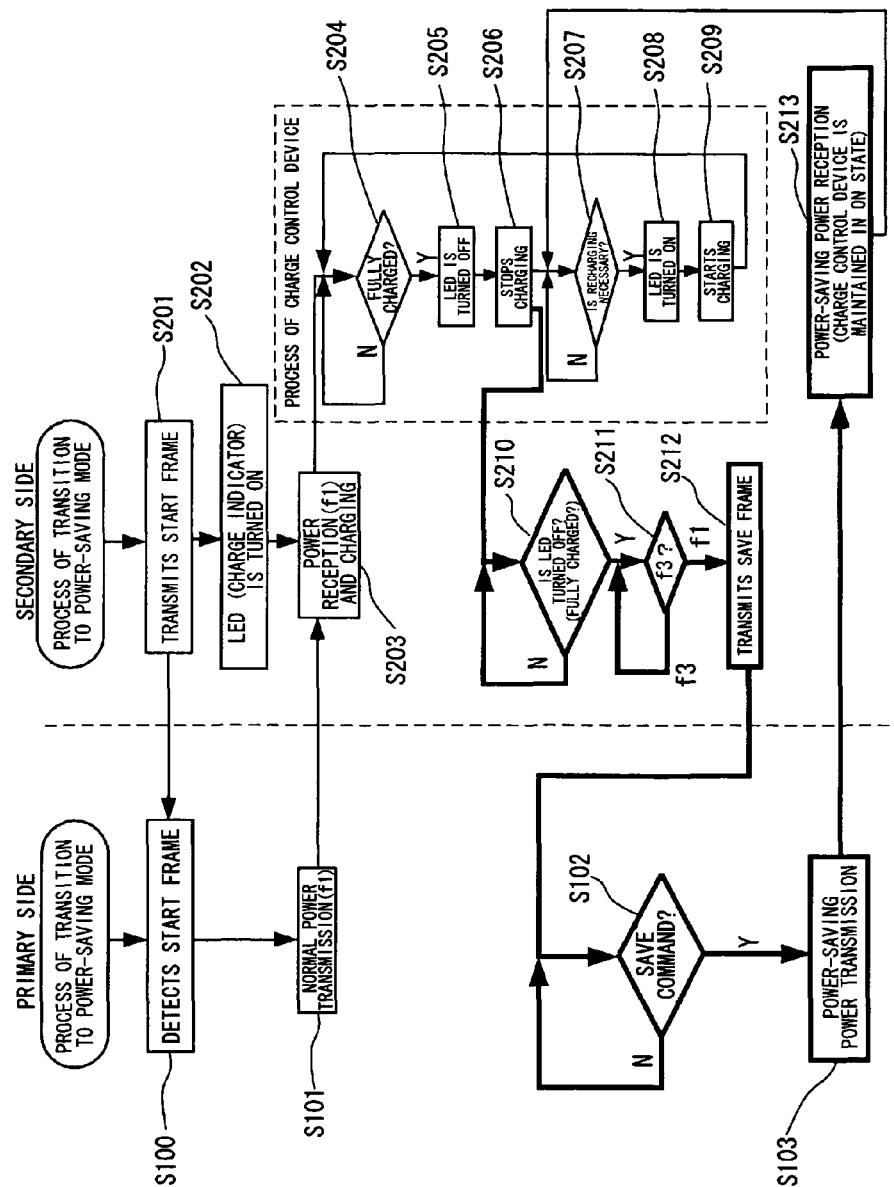
FIG. 7 is a flowchart showing an example of a specific procedure relating to a transition to a power-saving mode when a battery has been fully charged.

Operation from Full-Charge Detection to Power-Saving Power Transmission: FIG. 7

An example of a specific procedure relating to a transition to power-saving power transmission is described below with reference to FIG. 7. FIG. 7 is a flowchart showing an example of a specific procedure relating to a transition to the power-saving mode when the battery has been fully charged. In the following description, the power transmission device 10 side (instrument) is referred to as a primary side (primary-side instrument), and the power reception device 40 side (instrument) is referred to as a secondary side (secondary-side instrument).

In FIG. 7, an important step relating to a transition to the power-saving mode is indicated by a bold line.

In FIG. 7, the secondary-side instrument transmits a start frame which requests charging (step S201), and the light-emitting device (LEDR) as a charge indicator (charge level indicator) is turned ON (step S202).

The primary-side instrument detects the start frame (step S100), and starts normal power transmission at the frequency f1 (step S101).

The secondary-side instrument performs normal power reception (frequency f1) (step S203). The charge control device 92 performs the charge management operation relating to the battery 94, as described above. Specifically, the charge control device 92 performs charge level detection, charge state display control by ON/OFF-controlling the light-emitting device (LEDR), detection of whether or not the battery has been fully charged, overcharge prevention, detection of whether or not recharging is necessary, and recharging.

As indicated by a dotted line in FIG. 7, the charge control device 92 detects whether or not the battery has been fully charged (step 204), causes the light-emitting device (LEDR) to be turned OFF (step S205), stops charging (step S206), determines whether or not recharging is necessary (step S207), causes the light-emitting device (LEDR) to be turned ON when recharging is necessary (step S208), and again starts charging (step 209).

The secondary-side (power-receiving-side) control circuit 52 determines that the battery 94 has been fully charged when the light-emitting device (LEDR) has been turned OFF (step S205) for five seconds, for example (step S210), and transmits the save frame to the primary-side instrument when the frequency is other than the frequency f3 during power-saving power transmission (i.e., high frequency f1 or f2 during normal power transmission shown in FIG. 4) (step S212).

The save frame contains a save command which requests power-saving power transmission. The primary-side (power-transmission-side) control circuit 22 detects the save command transmitted from the secondary-side instrument (step S102), and starts power-saving power transmission (power transmission frequency f3) (step S103).

The secondary-side instrument performs power-saving power-receiving operation so that the operating state of the charge control device (charge control IC) 92 is maintained and the charge management function (including the recharge management function) is not canceled (step S213). This causes the battery 94 to be to immediately recharged when it is necessary to recharge the battery 94.

Figure 8:
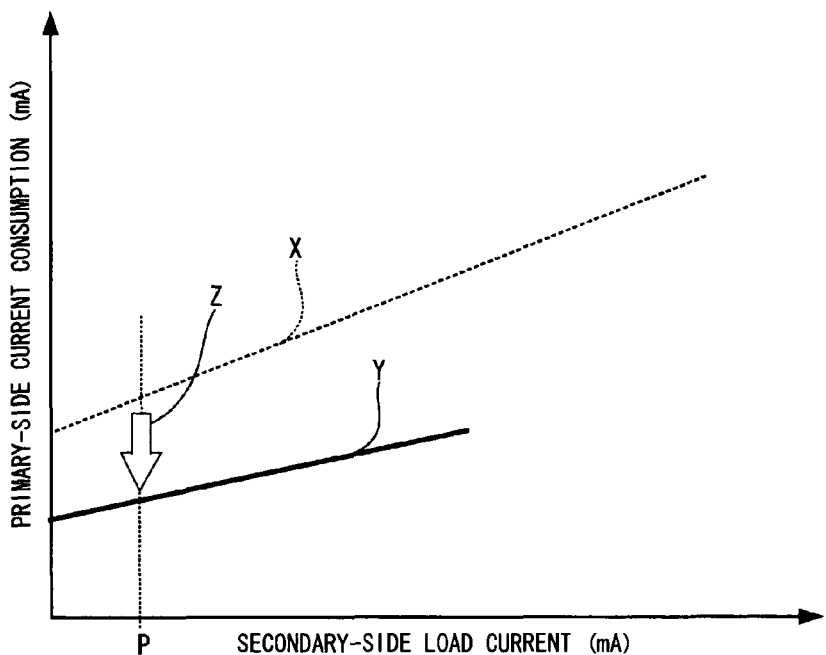
FIG. 8 is a view illustrative of a reduction in power consumption due to a power-saving mode.

FIG. 8 is a view illustrative of a reduction in power consumption due to the power-saving mode. In FIG. 8, the horizontal axis indicates the secondary-side load current, and the vertical axis indicates the primary-side current consumption. In FIG. 8, a characteristic line X indicated by a dotted line shows characteristics during normal power reception, and a characteristic line Y indicated by a solid line shows characteristics during power-saving power reception. A point P indicates a representative point of the secondary-side load current in a standby state. An arrow Z in FIG. 8 indicates a reduction in current consumption in a standby state.

As indicated by the arrow Z in FIG. 8, power-saving power transmission significantly reduces power consumption as compared with normal power transmission. Specifically, since only a small amount of power which supplies a power supply voltage (e.g., about 5 V) which merely causes the charge control device 92 to operate is transmitted during power-saving power transmission, an increase in power consumption may be disregarded.

Figure 9:
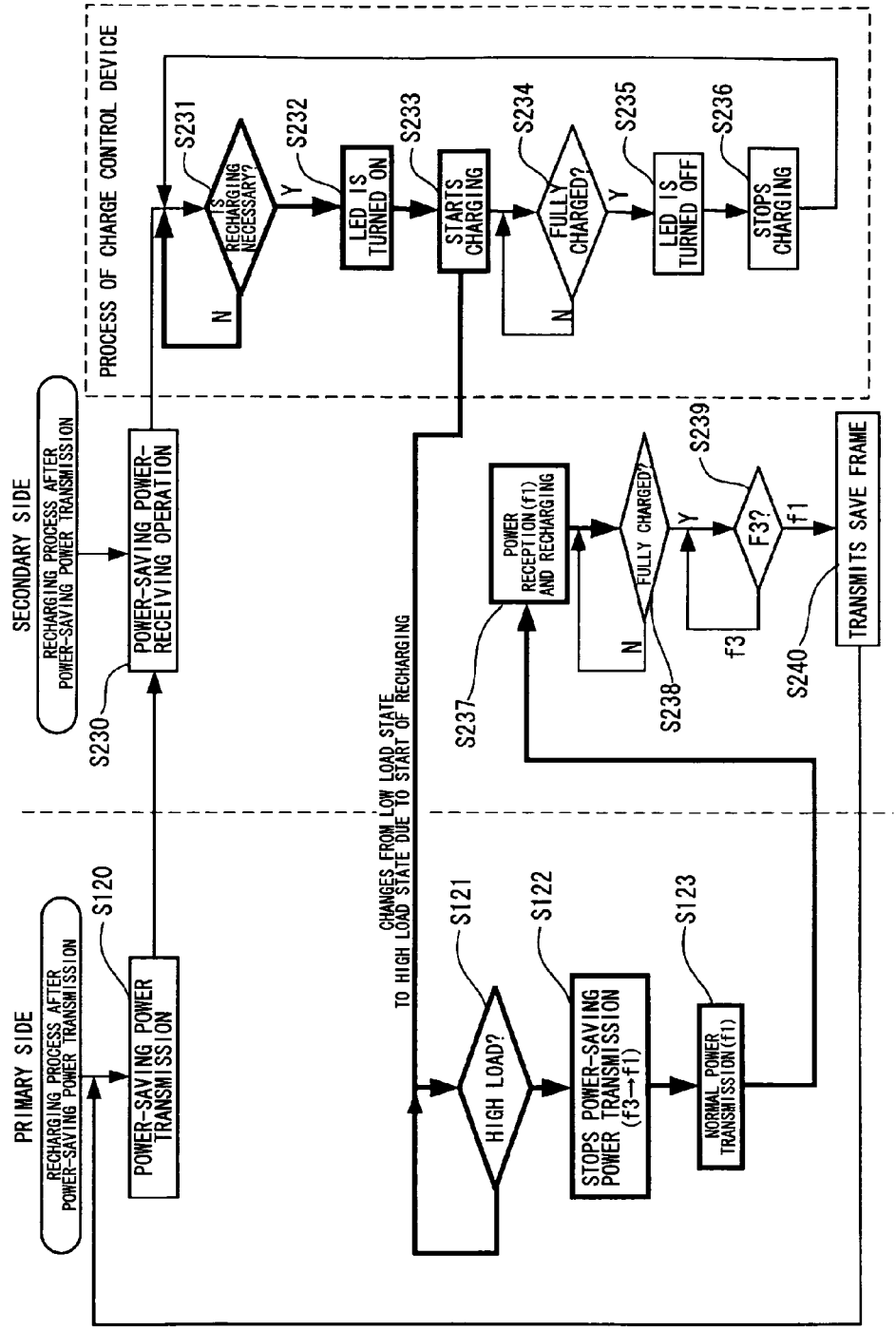
FIG. 9 is a flowchart showing an example of a process which switches power transmission from power-saving power transmission to normal power transmission when recharging has started after power-saving power transmission.

Switching to Normal Power Transmission Due to Recharging after Power-Saving Power Transmission FIG. 9 is a flowchart showing an example of a process which switches power transmission from power-saving power transmission to normal power transmission when recharging has started after power-saving power transmission. In FIG. 9, an important step relating to the above process is indicated by a bold line.

In FIG. 9, the primary-side instrument is performing power-saving power transmission (step S120), and the secondary-side instrument is performing-saving power reception (step S230). The charge control device 92 constantly performs control described with reference to FIG. 7, such as determining whether or not recharging is necessary, ON/OFF-controlling the light-emitting device (LEDR) as a charge level indicator, starting charging, detecting whether or not the battery has been fully charged, or stopping charging (steps S231 to S236).

Suppose the case where the charge control device (charge control IC) 92 has started recharging the battery 94 in the power-saving mode utilizing the charge management function (see steps S231 to S233). In this case, it is necessary to transmit a sufficient amount of power from the primary-side instrument (power transmission device 10) to the power reception device 40 in order to continue to recharge the battery 94. However, necessary power cannot be transmitted by power-saving power transmission.

Therefore, the primary-side power transmission control device 20 (power-transmission-side control circuit 22) monitors the load state of the power reception device 40 with respect to the power transmission device 10. The load state may be monitored constantly or intermittently at short intervals. When the load state is monitored intermittently, a change in the load state of the power reception device can be detected in almost real time by reducing the monitoring interval, whereby a delay in detection does not occur.

The load state is monitored using the voltage detection circuit 14, the waveform detection circuit 28, and the powertransmission-side control circuit 22 of the primary-side instrument. Specifically, since the amplitude of the induced voltage in the primary coil L1 increases in a high-load state, as shown in FIG. 3B, a change in the amplitude may be detected using peak-hold technology or the like.

When the load state of the power reception device 40 has changed from a low-load state to a high-load state due to recharging, the power transmission control device 20 quickly detects a change in load state (step S121), immediately changes power transmission from power-saving power transmission to normal power transmission (step S122), and transmits power necessary for recharging to the power reception device 40 (step S123).

Therefore, a sufficient amount of power is supplied to the power reception device immediately after recharging has started. The secondary-side instrument performs normal power reception (frequency f1), and supplies power to the load 90 to effect recharging (step S237). When the battery has been again fully charged (step S238), the secondary-side instrument checks that the power transmission frequency is not the power-saving transmission frequency (f3) (step S239), and transmits the save frame (including save command) to the primary-side instrument (step S240). This causes power-saving power transmission to again start (step S120).

As described above, when the battery 94 is recharged after power-saving power transmission, the primary-side instrument can automatically detect that the battery 94 is recharged without notification from the secondary-side instrument and resume normal power transmission. Such control can be easily implemented based on software. Therefore, a very efficient recharging control can be implemented.

Detection of Removal after Power-Saving Mode

Figure 10:
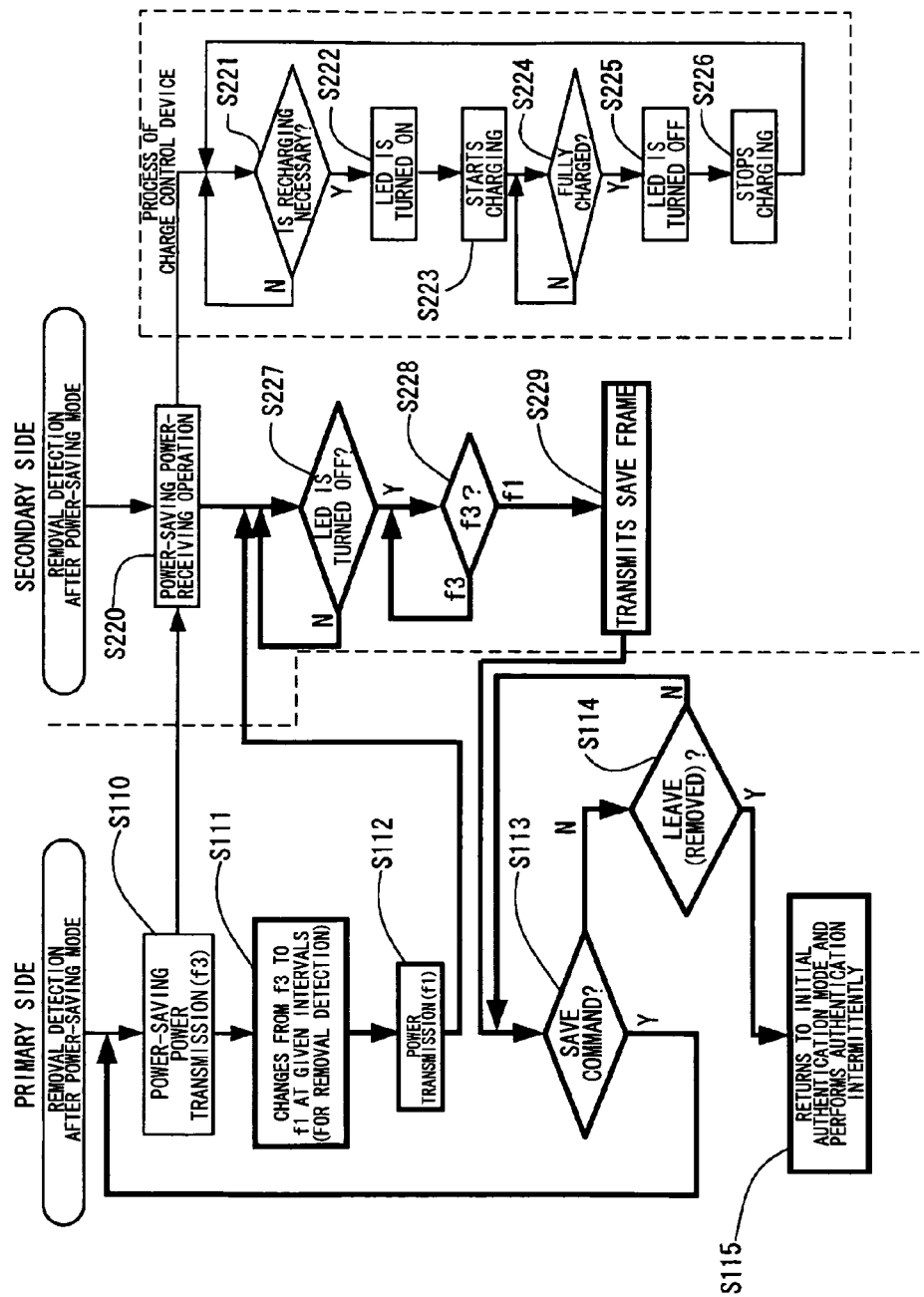
FIG. 10 is a flowchart showing an example of a specific procedure relating to a removal detection process after a power-saving mode.

FIG. 10 is a flowchart showing an example of a specific procedure relating to a removal (leave) detection process after the power-saving mode. In FIG. 10, an important step directly relating to removal (leave) detection is indicated by a bold line.

The operation of the secondary-side instrument in FIG. 10 is basically the same as the operation shown in FIGS. 5 and 7. Specifically, the secondary-side power reception control device 50 (power-receiving-side control circuit 52) performs power-saving power reception (step S230), performs normal power reception (power transmission frequency f1) (step S237), performs full-charge detection (step S238), checks whether or not the power transmission frequency is other than the power-saving power transmission frequency f3 (step S239), and transmits the save frame (step S240).

The charge control device (charge control IC) 92 constantly performs control described with reference to FIGS. 7 and 9, such as determining whether or not recharging is necessary (step S221), ON/OFF-controlling the light-emitting device (LEDR) as a charge level indicator (steps S222 and S225), starting charging (step S223), detecting whether or not the battery has been fully charged (step S224), or stopping charging (steps S226).

The characteristic point is that the primary-side instrument cyclically changes the power transmission frequency from the frequency f3 to the frequency f1 during power-saving power transmission in order to detect removal (leave) of the secondary-side instrument (step S111) to temporarily resume normal power transmission (step S12).

When the secondary-side device (electronic instrument including the power reception device 40) has been removed, no response is sent for a change in frequency. On the other hand, when the secondary-side device has not been removed, the save frame (including the save command) is returned through the processes in the steps S227 to S229.

Therefore, the primary-side instrument determines whether or not the save command is returned from the secondary-side instrument corresponding to a change in power transmission frequency (S113). When the save command has been returned, the primary-side instrument determines that the secondary-side device has not been removed, and returns the power transmission frequency from the frequency f1 to the frequency f3 to resume power-saving power transmission (step S110). On the other hand, when the save command has not been returned, the primary-side instrument carefully determines whether or not the secondary-side device has been removed by repeating the above process (step S114), stops continuous power transmission, and then returns to an initial authentication mode in which the primary-side instrument intermittently transmits power, for example (step S115).

As described above, removal (leave) of the secondary-side instrument during power-saving power transmission can be detected based on software with using special hardware, whereby a situation in which continuous power transmission is performed even if the secondary-side instrument has been removed can be reliably prevented. Therefore, safety and low power consumption can be ensured even when performing power-saving power transmission.

As described above, some embodiments of the invention achieve the following effects, for example. Note that the following effects are not necessarily achieved at the same time. Accordingly, the following effects do not in any way limit the scope of the invention.

(1) The charge management function of the load (charge control device) can be maintained by performing power-saving power transmission after the battery has been fully charged. Accordingly, when it is necessary to recharge the battery due to a discharge after the battery has been fully charged, the charge management function of the load causes the battery to be recharged automatically. Therefore, the battery can be easily recharged. Moreover, power-saving power transmission transmits only a small amount of power which merely maintains the battery charge management function of the load. Specifically, power consumption is sufficiently reduced during power-saving power transmission. Therefore, a problem relating to power consumption does not occur.

(2) Normal power transmission can be changed to power-saving power transmission at an appropriate timing by causing the secondary-side instrument to transmit the save command (information relating to the full-charge state of the battery) which requests power-saving power transmission and changing power transmission to power-saving power transmission based on the save command.

(3) The power transmission control device monitors a change in load due to recharging the battery during power-saving power transmission, and immediately changes power transmission from power-saving power transmission to normal power transmission when the start of recharging has been detected. Therefore, a sufficient amount of power necessary for recharging can be quickly supplied to the power reception device so that the battery can be continuously recharged.

(4) Power consumption can be reduced by causing the power transmission control device to intermittently monitor the load state of the power reception device. A change in the load state of the power reception device can be detected in almost real time by reducing the monitoring interval. This prevents a problem in which a delay in detection occurs.

(5) The power transmission control device compulsorily changes power transmission from power-saving power transmission to normal power transmission in a given cycle during power-saving power transmission, and monitors a response to the change from the power reception device to automatically detect detachment. Therefore, a situation in which the power transmission device continuously transmits power although the power reception device does not exists can be reliably prevented, whereby unnecessary power consumption can be suppressed. Moreover, since heat generation does not occur, the safety of the non-contact power transmission system can be ensured. Moreover, removal of the power reception device can be easily detected based on software without using a special hardware configuration by employing a method which changes power transmission from power-saving power transmission to normal power transmission and waits for response from the power reception device.

(6) The power reception control device detects whether or not the battery of the load has been fully charged, and transmits information (e.g., save command) relating to whether or not the battery has been fully charged to the power transmission device, whereby power transmission can be changed from normal power transmission to power-saving power transmission.

(7) The save command is transmitted to the power transmission device (primary side) when the battery has been fully charged (first condition) and the power transmission frequency from the power transmission device is a frequency other than the power-saving power transmission frequency (second condition). Therefore, a leave command can be transmitted to the primary-side instrument when the battery has been fully charged during normal power transmission and when the transmission frequency is compulsory changed for detachment detection. Since this requires simple control, implementation is facilitated.

(8) Since whether or not the battery has been fully charged is determined based on the ON/OFF state of the light-emitting device (e.g., LED), it is unnecessary to provide a special circuit in order to determine whether or not the battery has been fully charged. This simplifies the circuit configuration.

(9) Since the battery is determined to have been fully charged when the light-emitting device is turned OFF for a given period of time, a situation does not occur in which power-saving power transmission suddenly occurs even if the battery has not been fully charged.

(10) In the non-contact power transmission system according to the invention, power-saving power transmission enables the battery to be easily recharged utilizing the battery charge management function of the load. Moreover, since a change in load accompanying recharging is automatically detected so that necessary power is promptly supplied, recharging smoothly proceeds. In addition, unnecessary power transmission is automatically stopped due to detachment detection during power-saving power transmission, whereby power consumption is reduced. Therefore, a practical non-contact power transmission system which can be used without worry can be implemented. Since whether or not the battery has been fully charged is detected using the charge management function of the load and optionally using a charge level display function utilizing the light-emitting device, a convenient system which can utilize the existing elements can be formed. It suffices that the charge control device provided in the load to manage battery charging in the same manner as in the case of using an AC adaptor irrespective of whether or not non-contact power transmission is used or whether power transmission is normal power transmission or power-saving power transmission. This makes it unnecessary to change the specification of the load (e.g., battery pack) of the power reception device. This contributes to widespread use of this system.

(11) Power consumption is reduced by causing the power transmission control device to intermittently monitor a change in load state accompanying recharging. Power consumption can be further reduced by setting the interval of cyclically and compulsorily changing the frequency for detachment detection to be longer than the load monitoring interval.

(12) A power transmission device which achieves appropriate power-saving power transmission can be implemented.

(13) A power reception device which achieves appropriate power-saving power reception can be implemented.

(14) A battery of an electronic instrument (e.g., portable terminal) which performs non-contact power transmission can be easily recharged while reducing power consumption, whereby the performance of the electronic instrument can be increased while increasing convenience.

(15) An electronic instrument as a charger (e.g., cradle) which performs non-contact power transmission can be provided with a power-saving power transmission function. Therefore, the battery of the power reception device can be easily recharged while reducing power consumption, whereby the performance of the electronic instrument can be increased while increasing convenience.

(16) As described above, the battery of the load can be recharged after the battery has been fully charged utilizing non-contact power transmission, whereby a high-performance battery charge control technology can be established which utilizes non-contact power transmission and can be used without worry.

The invention has been described above relating to the embodiments. Note that the invention is not limited to the above embodiments. Various modifications and variations may be made. Specifically, many modifications are possible in the embodiments without materially departing from the novel teachings and advantages of the invention.

Accordingly, such modifications are intended to be included within the scope of the invention. Any term (e.g., GND and portable telephone/charger) cited with a different term (e.g., low-potential-side power supply and electronic instrument) having a broader meaning or the same meaning at least once in the specification and the drawings can be replaced by the different term in any place in the specification and the drawings. Any combinations of the embodiments and the modifications are also included in the scope of the invention.

The configurations and the operations of the power transmission control device, the power transmission device, the power reception control device, and the power reception device, the full-charge state/recharge state detection method, and the recharging method are not limited to those described relating to the above embodiments. Various modifications and variations may be made.

At least one embodiment of the invention contributes to a safe and high-performance battery charge control technology utilizing non-contact power transmission. Therefore, the invention may be utilized for a power transmission control device (power transmission control IC), a power reception control device (power reception control IC), a non-contact power transmission system, a power transmission device (e.g., IC module), a power reception device (e.g., IC module), an electronic instrument (e.g., portable terminal or charger), and the like.

What is claimed is:

1. A power transmission control device of a non-contact power transmission system that transmits power from a power transmission device to a power reception device by electromagnetically coupling a primary coil and a secondary coil, the power reception device including a charge control device that manages charging a battery included in a load of the power reception device, the power transmission control device comprising:

a control circuit that controls the power transmission device, when the power transmission device has detected that the battery has been fully charged, the control circuit causing the power transmission device to stop normal power transmission to the power reception device, and perform power-saving power transmission that continuously transmits power that is lower than that transmitted during the normal power transmission, and can maintain an operating state of the charge control device.

2. The power transmission control device as defined in claim 1, the control circuit changing power transmission from the normal power transmission to the power-saving power transmission when receiving a save command that requests the power-saving power transmission from the power reception device.

3. The power transmission control device as defined in claim 1, the control circuit monitoring a load state of the power reception device during the power-saving power transmission; and when the power-transmission-side control circuit has detected that the load state of the power reception device has changed from a low-load state to a high-load state by starting recharge of the battery included in the load, the power-transmission-side control circuit changing power transmission from the power-saving power transmission to the normal power transmission.

4. The power transmission control device as defined in claim 3, the control circuit intermittently monitoring the load state of the power reception device at given intervals during the power-saving power transmission.

5. The power transmission control device as defined in claim 1, the control circuit changing power transmission from the power-saving power transmission to the normal power transmission in a given cycle during the power-saving power transmission, and monitoring a response from the power reception device relating to the change from the power-saving power transmission to the normal power transmission;

the power-transmission-side control circuit again changing power transmission from the normal power transmission to the power-saving power transmission when receiving a save command that requests the power-saving power transmission from the power reception device; and when the power-transmission control circuit cannot receive the save command from the power reception device, the power-transmission-side control circuit determining that the power reception device has been removed and stopping continuous power transmission.

6. A power reception control device provided in a power reception device of a non-contact power transmission system, the non-contact power transmission system transmitting power from a power transmission device to the power reception device by electromagnetically coupling a primary coil and a secondary coil to transmit the power to a load of the power reception device, the power reception control device comprising:

a power-reception-side control circuit that controls the power reception device, when a battery included in the load has been fully charged, the power-reception-side control circuit causing the power reception device to transmit information that indicates that the battery has been fully charged to the power transmission device, and causing the power reception device to transmit a save command that requests power-saving power transmission to the power transmission device when the power reception control device has detected that the battery has been fully charged and a power transmission frequency of the power transmission device is a frequency other than a power-saving power transmission frequency.

7. The power reception control device as defined in claim 6, the power reception control device further including:

a full-charge detection circuit that detects whether or not the battery has been fully charged; and a frequency detection circuit that detects the power transmission frequency of the power transmission device, the full-charge detection circuit detecting whether or not the battery has been fully charged based on an ON/OFF state of a light-emitting device that indicates a charge state of the battery; and the power-reception-side control circuit determining whether or not the power transmission frequency of the power transmission device is a frequency other than the power-saving power transmission frequency based on a detection result of the frequency detection circuit.

8. The power reception control device as defined in claim 7, the full-charge detection circuit determining that the battery has been fully charged when the light-emitting device has been successively turned OFF for a given period of time.

9. A non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power transmission device including a control circuit that controls the power transmission device;

the power reception device including:

a power-reception-side control circuit that controls the power reception device;

a full-charge detection circuit that detects whether or not a battery has been fully charged; and a frequency detection circuit that detects a power transmission frequency of the power transmission device;

the load of the power reception device including:

the battery; and a charge control device that manages charging the battery, detects that the battery requires recharging after the battery has been fully charged, and recharges the battery;

the power-reception-side control circuit performing control that the power reception device transmits a save command that requests power-saving power transmission to the power transmission device when the full-charge detection circuit has detected that the battery included in the load has been fully charged and the frequency detection circuit has detected that a power transmission frequency of the power transmission device is a frequency other than a power-saving power transmission frequency;

the control circuit changing power transmission from normal power transmission to the power-saving power transmission when receiving the save command from the power reception device during the normal power transmission, to continuously transmit power lower than that transmitted during the normal power transmission, and can maintain an operating state of the charge control device being transmitted power during the power-saving power transmission;

the control circuit monitoring a load state of the power reception device during the power-saving power transmission, and, when the power-transmission-side control circuit has detected that the load state of the power reception device has changed from a low-load state to a high-load state when recharging of the battery included in the load has started, the power-transmission-side control circuit changing power transmission from the power-saving power transmission to the normal power transmission; and the control circuit changing power transmission from the power-saving power transmission to the normal power transmission in a given cycle during the power-saving power transmission, monitoring a response from the power reception device relating to the change from the power-saving power transmission to the normal power transmission, again changing power transmission from the normal power transmission to the power-saving power transmission when a save command that requests the power-saving power transmission has been received from the power reception device, and determining that the power reception device has been removed when the power-transmission-side control circuit cannot receive the save command from the power reception device and causing the power transmission device to stop continuous power transmission.

10. The non-contact power transmission system as defined in claim 9, the power transmission control device intermittently monitoring the load state of the power reception device at given intervals, the given intervals being shorter than intervals when the power-transmission-side control circuit cyclically changes power transmission from the power-saving power transmission to the normal power transmission during the power-saving power transmission.

11. A power transmission device comprising:

the power transmission control device as defined in claim 1; and a power transmission section that generates an alternating voltage and supplies the alternating voltage to the primary coil.

12. A power reception device comprising:

the power reception control device as defined in claim 6; and a power receiving section that converts an induced voltage in a secondary coil into a direct voltage.

13. An electronic instrument comprising the power transmission device as defined in claim 11.

14. An electronic instrument comprising:

the power reception device as defined in claim 12; and a load, power being supplied to the load from the power reception device.

15. The power transmission control device as defined in claim 1, a first frequency differing from a second frequency, the first frequency being a power transmission frequency during the normal power transmission, and the second frequency being a power transmission frequency during the power-saving power transmission.

16. The power transmission control device as defined in claim 1, a difference between a second frequency and a third frequency being larger than a difference between a first frequency and the third frequency, the first frequency being a power transmission frequency during the normal power transmission, the second frequency being a power transmission frequency during the power-saving power transmission, and the third frequency being a resonance frequency of a power transmission resonant circuit.

17. The power transmission control device as defined in claim 1, the power during the power-saving power transmission allowing the charge control device to maintain the operating state.

* * * * *